Figure 1:
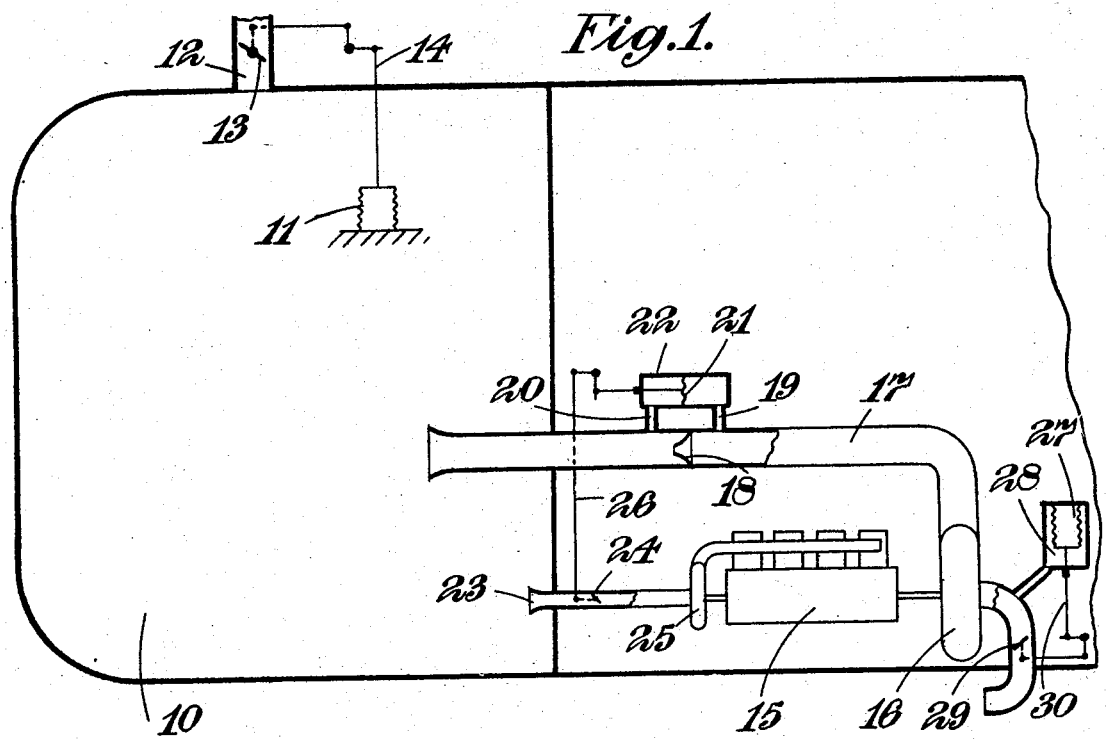

June 2, 1942. F. NIXON ET AL 2,284,984
HIGH-ALTITUDE AIRCRAFT
Filed Feb. 13, 1941     2 Sheets-Sheet 1

Inventors
Frank Nixon
and Elwyn I. B. Marples
by Wilkinson & Mawhinney
Attorneys.

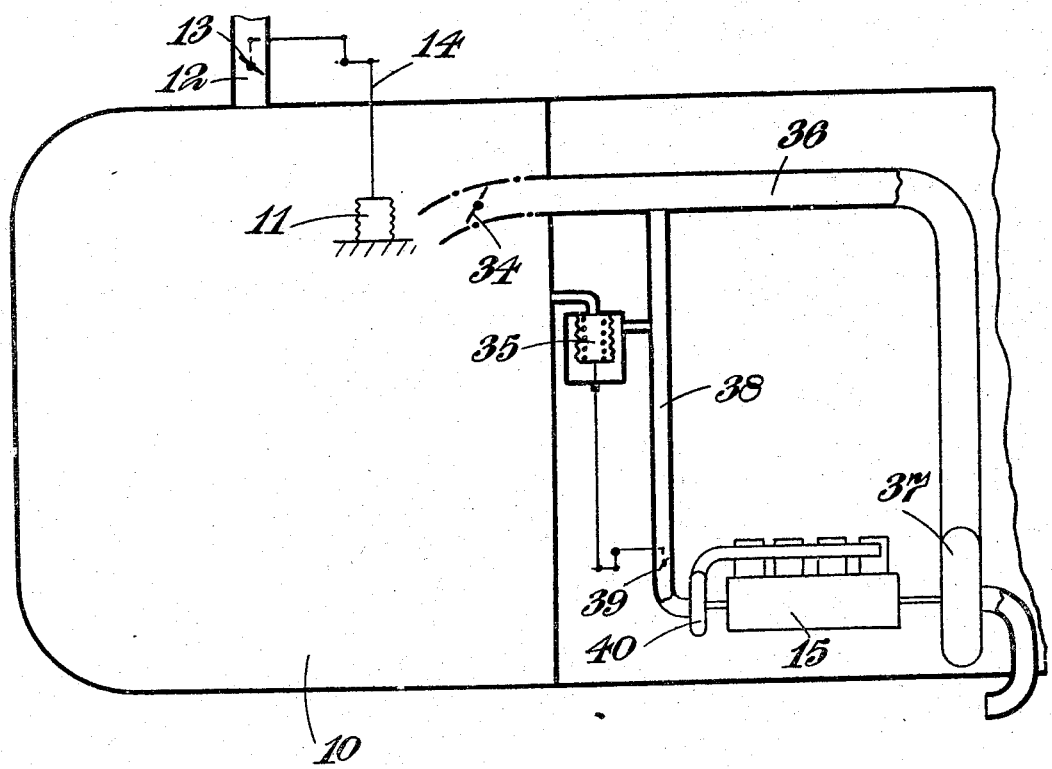

Patented June 2, 1942

2,284,984

UNITED STATES PATENT OFFICE 2,284,984

HIGH-ALTITUDE AIRCRAFT

Frank Nixon and Elwyn Ivo Banks Marples, Bristol, England, assignors to The Bristol Aeroplane Company Limited, Bristol, England, a British company Application February 13, 1941, Serial No. 378,827
In Great Britain January 20, 1940

2 Claims. (Cl. 128—204)

This invention relates to high-altitude aircraft of the kind comprising means for raising the air-pressure within a closed compartment, hereinafter termed the "cabin," with respect to the pressure of the surrounding atmosphere in order to avoid the discomfort or distress which is otherwise caused to the occupants through having to breathe very rarefied air.

The invention is applied to aircraft of the type in which the cabin is made capable of substantially airtight closure, with suitable valves, and is supplied with air from a blower driven by an auxiliary engine on the aircraft.

It is not necessary to maintain the pressure in the cabin equal to atmospheric pressure but it is desirable that it should not fall below a certain minimum, such, for example, as the atmospheric pressure existing at an altitude of about 10,000 feet; this pressure is sufficient for most human beings, but troubles arise if the pressure becomes much lower.

According to this invention, there is provided in a high-altitude aircraft of the type described, the combination with an outlet valve from the cabin, of a pressure-responsive device within the cabin and an interconnection between said device and said valve such that the pressure of the air within the cabin is maintained constant for all altitudes above a predetermined minimum. The air-pressure within the cabin is thereby controlled in a very simple manner. If the pressure is above the predetermined minimum, the valve is opened and any excess pressure is relieved, but when the pressure within the cabin falls to the predetermined minimum the valve is closed and maintained closed unless the supply of air given to the cabin is such as to raise the pressure, when the valve is opened; under all conditions of altitude, therefore, the pressure is maintained at not less than the predetermined minimum.

This invention also comprises automatic means for controlling the supply of air to the cabin, and according to another feature of the invention, means are provided for automatically maintaining a uniform volume-flow of air from the blower or supercharger into the cabin. This automatic control may be provided by means of a contracted orifice arranged in the pipe leading from the cabin-supercharger to the cabin, with a pressure-responsive device connected to said pipe so as to respond to the pressure-difference between the two sides of said orifice, and an operative connection between said pressure-responsive device and the throttle-valve of the engine.

In an alternative arrangement, a pressure-responsive device connected to the pipe between the supercharger and the cabin may be operatively connected to a valve in the intake-pipe of the supercharger, to control the delivery thereof.

In some instances it may be desired to provide for a variable delivery of air to the cabin and this invention also comprises means for automatically controlling such delivery. The said means may comprise a pressure-responsive device exposed on one side to the pressure existing in the cabin and on the other side to the air-pressure existing in the discharge-pipe of the cabin-supercharger and an operative connection from said device to the throttle-valve of the engine driving the cabin supercharger such that the speed of the egine is controlled in accordance with the required variations in delivery of air to the cabin.

Figure 2:
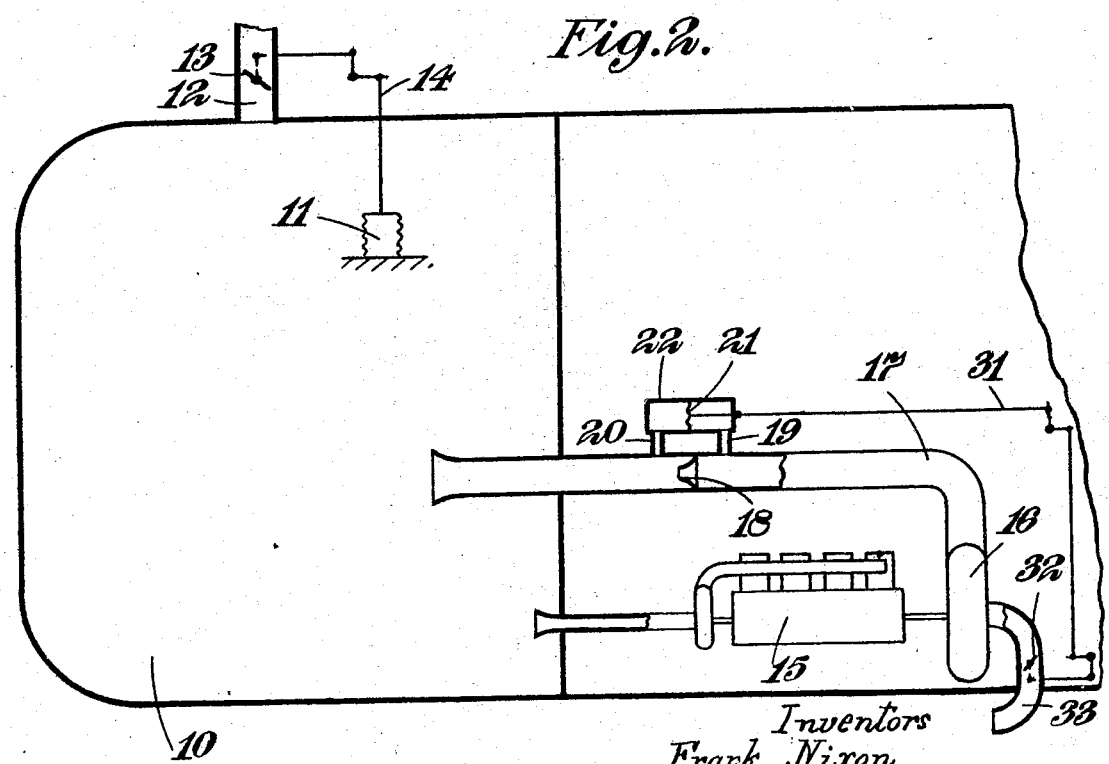

In the accompanying drawings, which are purely diagrammatic:

Figures 1 to 3 show alternative arrangements for the supply of air to the cabin, and means for controlling such supply.

Referring first to Figure 1, the aircraft cabin is indicated at 10, and within the cabin there is provided a collapsible capsule 11 or other pressure-responsive device which is subject to the pressure within the cabin. An outlet 12 is provided from the cabin and in it there is arranged a valve 13 which is interconnected, as shown diagrammatically by the linkage 14, with the capsule 11 in such manner as automatically to maintain the pressure within the cabin at a predetermined value when an altitude has been reached at which supercharging becomes necessary. This altitude may be about 10,000 feet, as mentioned above, and the arrangement is such that if the pressure in the cabin falls below this value the capsule expands and closes the valve 13. An air supply to the cabin is provided by an auxiliary engine 15 operating a blower or supercharger 16 which may be of any desired type, either a centrifugal blower or a displacement blower. The air is delivered from the blower 16 by a pipe 17 into the cabin; when the blower is in operation, therefore, there will normally be a sufficient supply of air to provide adequate ventilation and the valve 13 will be closed to such an extent that pressure within the cabin is maintained at the desired value.

In order to maintain a uniform supply of air to the cabin under all conditions there is provided in the pipe 17 a restricted orifice 18 which creates a pressure-drop in the pipe depending on the volume of air passing through it and from each side of this orifice connections 19, 20 are taken to a pressure-responsive device indicated as a flexible diaphragm 21 in the chamber 22, the pressure-difference in 19, 20 being applied respectively to the two sides of the diaphragm.

The engine 15 draws its air-supply from the cabin by a conduit 23 controlled by a throttle-valve 24, and since this engine has to work at varying altitudes it is preferably provided with a supercharger 25 together with the usual automatic or other controls for such an engine.

The pressure-responsive device 21 is inter-connected as by the link 26 to the throttle-valve 24 of the engine in such manner as to maintain a substantially uniform delivery of air from the blower 16. If there is an excessive delivery of air, the pressure-drop across the orifice 18 increases and the diaphragm 21 is moved to the left, thereby moving the throttle-valve 24 in a closing direction so as to reduce the power output of the engine, and vice versa.

An additional or alternative control may be provided on the intake to the blower 16, by means of a collapsible capsule 27 in a chamber 28 which is open to the pressure existing in the intake of the blower 16. An intake-valve 29 is coupled by a link 30 to the capsule 27 in such manner as to open or close the air-intake passage to the blower 16 in accordance with the variations in the pressure existing therein. Thus, for example, if the pressure in the intake to the blower 16 increases or decreases, the valve 29 is opened or closed correspondingly so as to maintain a uniform rate of delivery of air by this blower.

In the arrangement illustrated in Figure 2, the cabin 10 is provided with the valve 13 and controlling capsule 11 as arranged in Figure 1, but the control of the volume of air delivered by the blower is effected in a more simple manner than in Figure 1. The blower 16 delivers the air by the pipe 17 through a contracted orifice 18 and a pressure-responsive device 21, similar to that shown in Figure 1, is interconnected by the linkage 31 to a valve 32 in the intake 33 of the blower 16. In this way, the effective area of the intake of the blower 16 is controlled by the output from the blower so as to maintain that output substantially constant.

The arrangement shown in Figure 3 may be used when the air-supply to the cabin is to be regulated according to the demands made upon it, instead of as in Figures 1 and 2 wherein a constant-volume supply is provided. The variable delivery or demand is indicated diagrammatically by the adjustable valve 34 on the inlet to the cabin. In this arrangement there is provided a collapsible capsule 35 which is subjected on one side to the pressure existing within the cabin 10, and on the other side to the pressure existing in the pipe 36 which supplies the air to the cabin, which is the pressure developed by the blower 37. The engine 15 for this blower is supplied with air from the pipe 36 by the pipe 38 under the control of a throttle-valve 39; for the reasons given above the engine is provided with a second-stage supercharger 40. The capsule 35 is interconnected with the throttle-valve 39 so as to vary the engine-speed in accordance with the demand. An increased demand, which would be represented by opening the valve 34, diminishes the pressure-difference between the cabin 10 and the pipe 36 so that the capsule 35 expands and opens the throttle-valve 39, and correspondingly a diminished demand results in closing the valve 39.

In this arrangement the engine 15 may be subjected to considerable speed-variations during its operation and it is, therefore, preferred to use a displacement type of blower instead of a centrifugal blower, in order to make the whole system more stable in its operation. It is possible, however, to use a centrifugal blower if a throttle is provided in the intake thereof and controlled in a similar manner to that shown in Figure 1.

We claim:

1. In a high-altitude aircraft, the combination of a cabin capable of substantially airtight closure, a blower supplying air to said cabin, an engine driving said blower, a pressure-responsive device in said cabin, an outlet valve from said cabin, a pressure responsive device within said cabin, and an interconnection between said device and said outlet valve which closes said valve when the pressure within the cabin reaches a predetermined minimum, a pipe connecting said blower with said cabin, a contracted orifice in said pipe, a second pressure-responsive device connected to said pipe at the two sides of said orifice, a throttle valve on said engine, and an operative connection therefrom to said second pressure-responsive device.

2. In a high-altitude aircraft, the combination of a cabin capable of substantially airtight closure, a blower supplying air to said cabin, an engine driving said blower, a pressure-responsive device in said cabin, an outlet valve from said cabin, a pressure responsive device within said cabin, and an interconnection between said device and said outlet valve which closes said valve when the pressure within the cabin reaches a predetermined minimum, a pipe connecting said blower with said cabin, a contracted orifice in said pipe, a second pressure-responsive device connected to said pipe at the two sides of said orifice, a throttle valve on said engine, an operative connection therefrom to said second pressure-responsive device, a controlling valve on the intake of said blower, a third pressure-responsive device subject to the pressure existing between said valve and said blower, and an operative connection between the third pressure-responsive device and said valve.

FRANK NIXON.
ELWYN IVO BANKS MARPLES.